US011950332B2

(12) United States Patent
Altamura

(10) Patent No.: US 11,950,332 B2
(45) Date of Patent: Apr. 2, 2024

(54) RESISTIVE BYPASS FOR SERIES LIGHTING CIRCUIT

(71) Applicant: Seasonal Specialties, LLC, Eden Prairie, MN (US)

(72) Inventor: Steven J. Altamura, Scarsdale, NY (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 0 days.

(21) Appl. No.: 18/062,685

(22) Filed: Dec. 7, 2022

(65) Prior Publication Data

US 2023/0110144 A1 Apr. 13, 2023

Related U.S. Application Data

(60) Continuation of application No. 17/400,338, filed on Aug. 12, 2021, now Pat. No. 11,533,794, which is a continuation of application No. 16/693,552, filed on Nov. 25, 2019, now Pat. No. 11,096,252, which is a continuation of application No. 15/899,264, filed on Feb. 19, 2018, now Pat. No. 10,492,282, which is a continuation of application No. 14/840,705, filed on Aug. 31, 2015, now Pat. No. 9,900,968, which is a continuation of application No. 14/052,124, filed on Oct. 11, 2013, now abandoned, which is a continuation of application No. 12/947,488, filed on Nov. 16, 2010, now abandoned, which is a division of application No. 11/962,964, filed on Dec. 21, 2007, now Pat. No. 7,851,981.

(60) Provisional application No. 60/876,868, filed on Dec. 22, 2006.

(51) Int. Cl.
*H05B 39/04* (2006.01)
*H01J 9/00* (2006.01)
*H01K 3/00* (2006.01)
*H05B 47/23* (2020.01)

(52) U.S. Cl.
CPC .............. *H05B 39/041* (2013.01); *H01J 9/00* (2013.01); *H01K 3/00* (2013.01); *H05B 47/23* (2020.01)

(58) Field of Classification Search
CPC ......... H05B 39/041; H05B 47/23; H01J 9/00; H01K 3/00
See application file for complete search history.

(56) References Cited

U.S. PATENT DOCUMENTS

| | | | |
|---|---|---|---|
| 1,024,495 | A | 4/1912 | Booth |
| 1,510,847 | A | 4/1922 | Holder |
| 1,865,689 | A | 6/1929 | Brander |
| 1,868,689 | A | 7/1932 | Brander |
| 2,072,337 | A | 3/1937 | Kamm |
| 2,152,228 | A | 5/1937 | Waters |
| 2,145,911 | A | 2/1939 | Waldemar et al. |
| 2,760,120 | A | 8/1956 | Fisherman |
| 3,260,888 | A | 7/1966 | Webb |
| 3,345,482 | A | 10/1967 | Lou |

(Continued)

*Primary Examiner* — Anne M Hines
(74) *Attorney, Agent, or Firm* — Hamre, Schumann, Mueller & Larson, P.C.

(57) ABSTRACT

A resistor bypass circuit for a series lighting circuit includes a plurality of serially connected light sources and a bypass resistor being connected in parallel with at least one of the respective light sources, each respective light source being low wattage and being capable operating on a one hundred percent duty cycle as desired.

14 Claims, 16 Drawing Sheets

(56) References Cited

U.S. PATENT DOCUMENTS

| | | | |
|---|---|---|---|
| 3,461,921 | A | 8/1969 | Ackerman |
| 3,868,230 | A | 2/1975 | Krukonis |
| 3,912,966 | A | 10/1975 | Harnden, Jr. |
| 3,942,063 | A | 3/1976 | Winter et al. |
| 4,463,278 | A | 7/1984 | Kosmatka et al. |
| 4,464,600 | A | 8/1984 | Kosmatka et al. |
| 4,629,943 | A | 12/1986 | Ponce, Jr. |
| 4,727,449 | A | 2/1988 | Fleck |
| 4,985,001 | A | 1/1991 | Nagai |
| 5,453,664 | A | 9/1995 | Harris |
| 5,777,868 | A | 7/1998 | Gibboney, Jr. |
| 5,886,423 | A * | 3/1999 | Gershen ............... H05B 39/105 315/179 |
| 6,084,357 | A | 7/2000 | Janning |
| 6,283,797 | B1 | 9/2001 | Wu |
| 6,323,597 | B1 | 11/2001 | Janning |
| 6,344,716 | B1 | 2/2002 | Gibboney, Jr. |
| 6,555,948 | B1 | 4/2003 | Noll |
| 6,580,182 | B2 | 6/2003 | Janning |
| 6,597,125 | B2 | 7/2003 | Janning |
| 6,690,103 | B1 | 2/2004 | Uke |
| 6,765,313 | B2 | 7/2004 | Janning |
| 6,929,383 | B1 | 8/2005 | Janning |
| 7,042,116 | B2 | 5/2006 | Janning |
| 7,166,968 | B2 | 1/2007 | Janning |
| 7,178,961 | B2 | 2/2007 | Janning |
| 7,261,458 | B2 | 8/2007 | Janning |
| 7,342,327 | B2 | 3/2008 | Janning |
| 7,666,036 | B1 | 2/2010 | Zou |
| 7,851,981 | B2 | 12/2010 | Altamura |
| 7,963,670 | B2 | 6/2011 | Yu |
| 8,450,950 | B2 | 5/2013 | McRae |
| 8,860,328 | B2 | 10/2014 | McRae |
| 8,941,312 | B2 | 1/2015 | McRae |
| 9,433,057 | B1 | 8/2016 | Janning |
| 9,510,406 | B2 | 11/2016 | McRae |
| 9,510,423 | B1 | 11/2016 | Janning |
| 9,544,437 | B2 | 1/2017 | Zubas et al. |
| 9,900,968 | B2 | 2/2018 | Altamura |
| 10,080,265 | B2 | 9/2018 | Altamura et al. |
| 10,333,252 | B1 | 6/2019 | Altamura |
| 11,096,252 | B2 | 8/2021 | Altamura |
| 2003/0117021 | A1 | 6/2003 | Janning |
| 2005/0174065 | A1 | 8/2005 | Janning |
| 2005/0205971 | A1 | 9/2005 | Janning |
| 2018/0199419 | A1 | 7/2018 | Altamura |

* cited by examiner

RESISTIVE BYPASS FOR SERIES LIGHTING CIRCUIT

RELATED APPLICATIONS

The present invention claims the benefit of U.S. Provisional Application 60/876,868, filed on Dec. 22, 2006, incorporated herein in its entirety by reference.

TECHNICAL FIELD OF THE INVENTION

The present invention is generally related to an improved light circuit for series circuits or series-parallel circuits utilizing incandescent, LED, or other types of lighting sources, and more particularly, the present invention relates to a resistive bypass element that will continue to conduct electricity and keep the remainder of the series circuit of lights lit even when one or more individual lighting elements are burnt out, defective, broken, have a loose connection or a broken connection in the series circuit, including series parallel circuits.

BACKGROUND OF THE INVENTION

Series connected circuits containing lighting sources are well known especially in lighting strings and flexible lighting (Rope Lights) around the holidays when such light strings are used for decorative purposes. More recently, series connected lighting sources are becoming popular in task lighting, general illumination, automotive lighting, and specialty lighting utilizing LEDs. Generally, the lights in these lighting circuits are electrically in series rather than in parallel. One particular drawback to these types of lighting circuits is that when a lighting source is removed from the circuit, is burnt out, defective, or has a loose connection, the entire lighting circuit is rendered inoperable. Each lighting element within the circuit completes the electrical circuit, so when a light source is removed (for a replaceable type), a connection becomes loose, or the lighting element burns out or other lighting component within the light source, a gap is created in the circuit and electricity is unable to continue to flow through the circuit. When a "good" light source is inserted into the circuit or socket, it completes the circuit, thus allowing electricity to flow uninterrupted.

Specifically, Fisherman, U.S. Pat. No. 2,760,120, discloses a series circuit for a light set with individual incandescent flasher or twinkle bulbs that include a bypass resistor in parallel with the bulb element. The operation of the Fisherman light set is limited to a set with a bulb that flashes on and off, a duty cycle of less than 100%. The on time of the bulb is necessary to control heat generation in the resistor, the resistor conducting during the off time of the bulb, thereby regulating the heat produced in the resistor circuit. The Fisherman device cannot be applied to a set wherein a bulb is burnt out, removed, or loose (and not conducting) to continue to illuminate the remaining bulbs in the circuit. In such situation, the bypass resistor is continually conducting and the temperatures generated on any bypass resistor of practical size (let alone one that fits into a socket) will far exceed ignition temperatures of near by materials used in construction of the set. Further, the Fisherman bulb is a high energy bulb, being 8 volt and ¼ amp, for a power consumption of 2 watts. A more energy efficient bulb is in demand at the present time. Presently, bulbs, such as that depicted generally at 500 in prior art FIG. 15, are utilized. Such bulbs are a considerable improvement when compared to the Fisherman bulb, having 0.35-0.425 watt power consumption. There is still a need in the industry for a more energy efficient bulb.

While previous mechanical and electrical circuit configurations have been used in an attempt to address the problems described above, none do so with the reliability, simplicity, low cost of the present invention, and reduced energy consumption. The difficulties and drawbacks of previous lighting series circuit configurations are overcome by the resistive bypass for a series light circuit of the present invention.

SUMMARY OF THE INVENTION

The systems and methods of the invention have several features, no single one of which is solely responsible for its desirable attributes. Without limiting the scope of the invention as expressed by the claims which follow, its more prominent features will now be discussed briefly. After considering this discussion, and particularly after reading the section entitled "Detailed Description of the Drawings" one will understand how the features of the light unit for a light string provide several advantages over traditional series light circuit.

Accordingly, it is an object of the present invention to provide a novel and improved bypass circuit for a series light circuit configuration capable of keeping uninterrupted current flow on condition that a light source of the circuit is removed, becomes loose, fails to conduct, or lighting element or other lighting device of the light source burns out, or becomes defective within the light source.

A further object of the present invention is to provide an incandescent bulb of reduced energy consumption while at the same time maintaining the level of brightness apparent to the human eye as is produced by current higher energy consuming bulbs (the standard bulb having a power consumption of 0.35-0.425 watts). The present invention utilizes bulbs that are less than 0.25 watts and are more preferably 0.20 watts. In order to achieve substantially the same brightness as the standard bulb, the bulb of the present invention uses a higher purity tungsten filament, along with a tighter coil for the filament when rated 0.20 watts. Further, to improve the brightness, the filament is placed higher into the bulb canopy, so that losses from the plastic bulb adaptor at the bottom of the bulb do not absorb as much light. This provides for a measurably brighter bulb, and also provides to the human eye an even apparently brighter bulb, as the filament is higher up into the bulb, something that hasn't been done in the industry to date. Such bulbs can be utilized with a duty cycle of 100% and, when disabled, the conducting bypass resistor in the circuit of the present invention does not achieve dangerous temperature levels due to the reduced current flow. The Fisherman device is necessarily restricted to employment with flasher bulbs, and these must be used in a set where the bulbs are never fully off (disabled) so that the bypass resistor is not continually conducting.

Another object of the present invention is to provide the ability to allow for semiconductor light sources, such as light emitting diodes (LEDs), to provide a twinkling affect, by utilizing LED packages that incorporate integrated circuits (ICs) or other types of electronic circuits that control the flashing rate of the light source, which would only effect the individual lighting element as the resistive bypass would allow current to continue to flow in remaining lighting elements in the series circuit. In another embodiment of the invention, one or more semiconductor light sources, each with a flashing circuit, but without an associated bypass element in parallel, can be located in the lighting circuit in order to flash all the remaining light sources in the series circuit.

In yet another embodiment of the invention, one or more incandescent light sources, each with a flashing device, but without an associated bypass element in parallel, can be located in the lighting circuit in order to flash all the remaining light sources in the circuit.

Yet another object of the present invention is to provide the ability to allow for semiconductor light sources, such as LEDs, to provide color changing characteristics by utilizing LED packages that incorporate two or more LED chips, and an IC, or other electronic circuit, that controls each LED chip in the LED package independently, while the electronic circuit or IC controls the current and/or voltage to the individual LEDs in the LED package, allowing for the mixing of the LED chip colors to get various resultant colors, which would only affect the individual lighting element as the resistive bypass would allow current to continue to flow in remaining lighting elements in the series circuit. Those skilled in the art would also recognize that a zener diode could be used in parallel to the light source and bypass circuit to help regulate the voltage across the light source.

Further objects and features of the invention will be readily apparent to those skilled in the art from the following specification which includes the appended claims and drawings.

To achieve the above objects and in accordance with the purpose of the invention, as embodied and broadly described herein, one embodiment of a light circuit for a series lighting circuit of the present invention comprises lighting sources connected in series with each other, where each lighting source has a resistive bypass element connected in parallel across it.

The embodiment of this device is to provide a low cost resistive bypass element for series connected light sources. The current movement towards low energy incandescent bulbs, LEDs, and other energy saving light sources allows for a simple resistor to be utilized without creating the heating issues previously faced if such a device was attempted. Now with these low power consuming lighting sources, a resistive bypass element becomes the forefront of products, providing a low-cost bypass circuit.

In addition, the use of the resistive bypass element in series connected lighting circuits enables longevity and durability to continue without affect from the failure of any single light source due to defect, or connection issues.

In another embodiment of the present invention, the resistive bypass element may be connected in parallel with more than one light source, where the failure of one bulb would then only affect a limited amount of light sources in the lighting circuit, further saving the cost of bypass resistive elements across each lighting source.

In another embodiment of the present invention, a resistive bypass circuit allows for other types of lighting effects, such as twinkle type products where a semiconductor light source can utilize miniature ICs inside a lighting package, and will only affect that lighting source, allowing the remaining light sources to function independently. Also, more than one light package may have the twinkling effect. For this embodiment, the resistive bypass may only be used across those twinkling effect light sources, as an additional embodiment, or may be used across all lighting sources.

One more embodiment of the resistive bypass circuit is that it also allows for the use of color changing LED packages, that utilize more than one LED chip inside, and may consist of an IC controlled mixing of the LED chips to create other resultant colors, and will only effect that lighting source, allowing the remaining light sources to function independently. Also, more than one light package may have this color changing effect. For this embodiment, the resistive bypass may only be used across those color changing light sources, as an additional embodiment, or may be used across all lighting sources.

The series circuits above with bypass resistors, can also be employed in series—parallel circuits, and be employed in products with or without lampholders, including directly connected to printed circuit boards, as other embodiments of the invention.

The present invention has numerous features and advantages associated therewith.

The bypass circuit of the present invention herein described has an advantage of keeping the remainder of lights within a series lighting circuit lit when a light source is missing from, or becomes loose in, one or more light source sockets or circuits, or becomes defective. This is accomplished by continuing to conduct electricity through the series light circuit even when a light source is broken, loose, poor connection, or defective light source.

The bypass circuit can be utilized in AC or DC circuits powered by batteries, step down transformers, AC utility power, or converters from AC to DC or DC to AC power, pulsed DC, and filtered or unfiltered DC.

As will be realized, the invention is capable of other and different embodiments and its several details are capable of modifications in various respects, all without departing from the invention. Accordingly, the drawing and description are to be regarded as illustrative and not restrictive.

Other objects, advantages and novel features of the present invention will be drawn from the following detailed description of preferred embodiment of the present invention with the attached drawings. The accompanying drawings are included to provide a further understanding of the invention, and are incorporated in and constitute a part of this specification. The drawings illustrate embodiments of the invention and, together with the description, serve to explain the principles of the invention, in which:

DETAILED DESCRIPTION OF THE DRAWINGS

Figure 1:
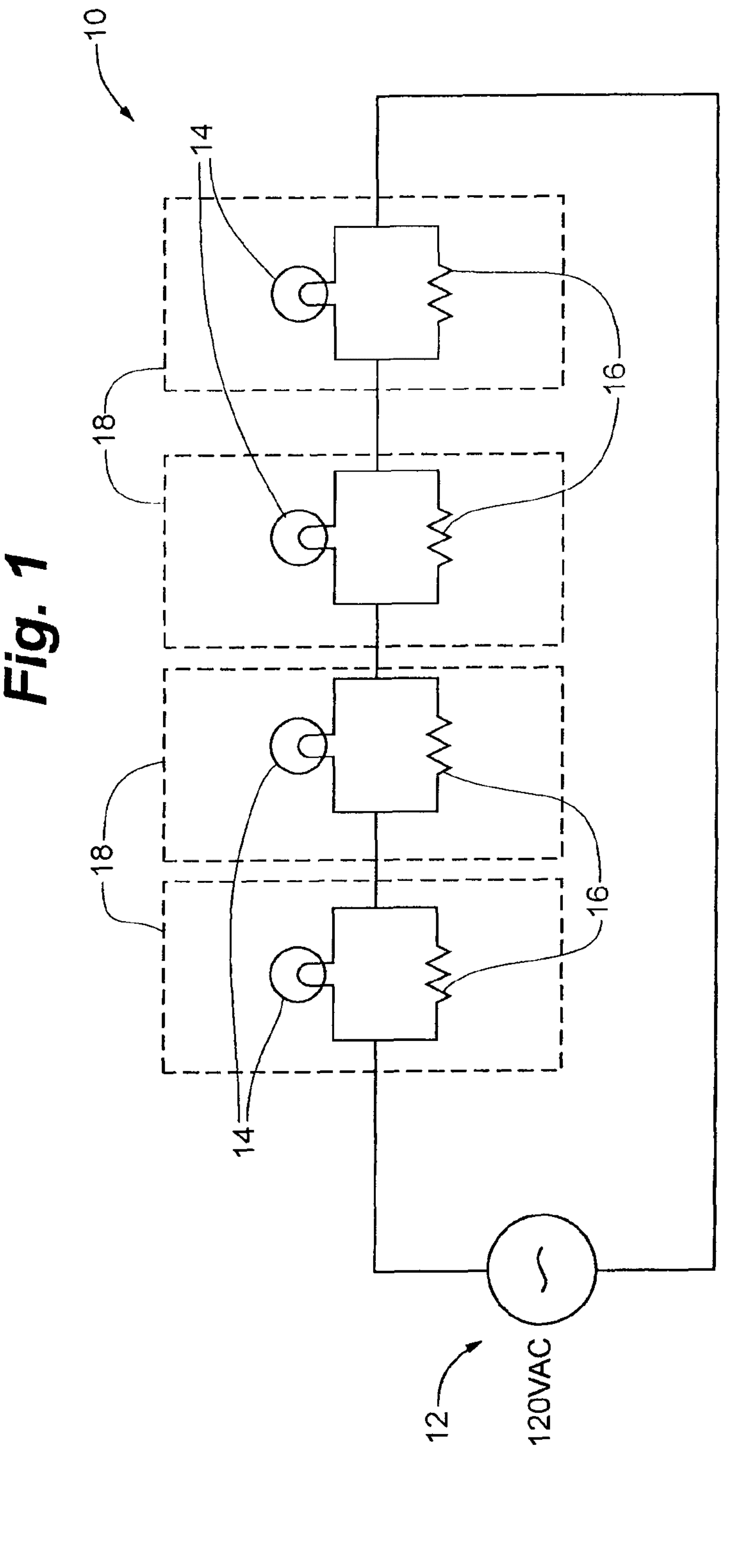
FIG. 1 is a circuit diagram of one embodiment of the present invention where the lighting sources are incandescent bulbs.

The resistive bypass circuit 10, being a set or sting of lights, as shown in FIG. 1 includes a power source 12, light sources 14, and bypass resistors 16. Power source 12 is shown in FIG. 1 is a 120 volt alternating current (AC) power source, power source can be any voltage AC, direct current (DC), AC converted to DC, or DC converted to AC, both filtered or unfiltered DC, and pulsating DC or any other power source that can power the lighting sources. Light sources 14 may include incandescent bulbs, LEDs, or other lighting devices. Light sources 14 of FIG. 1 are incandescent bulbs.

Bypass resistors 16 are configured in parallel with light sources 14, and combinations of bypass resistors 16 and light sources 14 are configured in series. Light sources 14 and bypass resistors 16 may be packaged together into light source assemblies 18. When all light sources 14 are operating properly, a portion of the total current flowing through bypass circuit 10 flows through light source 14, while the remainder flows through bypass resistor 16.

In the event that a light source 14 ceases to conduct, and current flow is interrupted through that light source 14, the total current will flow through its corresponding bypass resistor 16. A missing, broken, or improperly connected light source 14 may cause a light source 14 to fail to conduct. In the case where light source 14 is an incandescent bulb, filament failure, or burnout, may be the cause of a light source failing to conduct. Without bypass resistors 16 operating in parallel with light sources 14, any failure in a light source 14 would interrupt power to all other light sources 14. The values of bypass resistors 16 are typically the same, and are chosen such that an appropriate current flows through light sources 14 when all light sources are operating properly.

Figure 2:
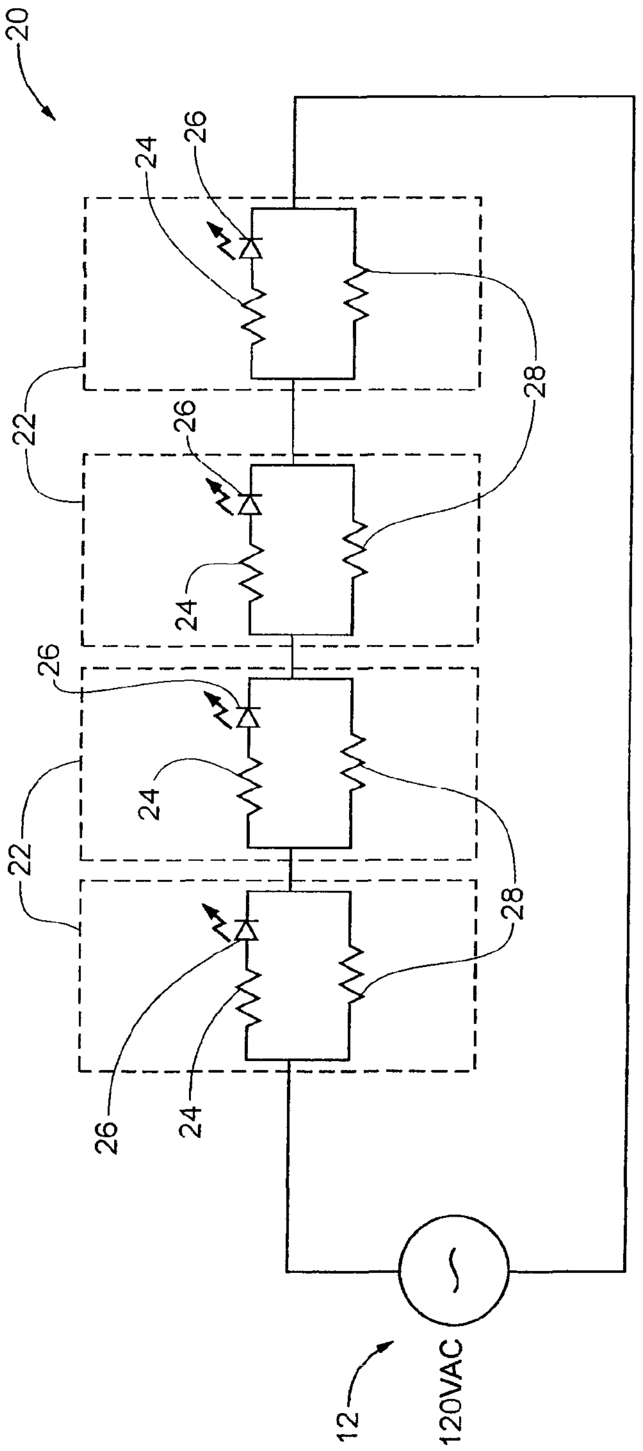
FIG. 2 is a circuit diagram of one embodiment of the present invention where the lighting sources include LEDs.

FIG. 2 illustrates another embodiment of the present invention that uses LEDs as a light source. Resistive bypass circuit 20 includes power source 12, light sources 26, optional current limiting resistors 24, and bypass resistor 28. Light sources 26, optional current limiting resistors 24, and bypass resistors 28 may be packaged together into light source assemblies 22. In the embodiment shown in FIG. 2, light source 26 is a single LED, preferably of equal to or less than 0.25 W. In other embodiments, light source 26 may be an LED chip that includes more than one LED. Those skilled-in-the-art will appreciate that the value of current limiting resistors 24 will be chosen based on the type of light source 26, the number of light sources 26, the number of bypass resistors 24, and the number and value of bypass resistors 28.

In the embodiment shown in FIG. 2, power source 12 provides power to bypass circuit 20. When all light sources 26 are operable, current flows through the circuit, with a portion of the total current flows through the path containing current limiting resistor 24 and light source 26, while the remainder flows through bypass resistor 28. When current flow is interrupted through a light source 26, total current flows through the corresponding bypass resistor 28, allowing the remaining light sources 26 to operate.

Resistive bypass circuits 10 and 20 may be used with any series, or series-parallel connected lighting device where failure of the bulb or its connection will turn off some or all of the bulbs. This includes mini-bulb lighting strings used for Christmas and other holiday decorative lighting, rope lights (also known as flexible lighting) and other general lighting applications that use series connected lamps or LEDs, such as a LED desk lamp, or under-counter light.

Power source 12 is shown in FIG. 2 is a 120 volt alternating current (AC) power source, power source can be any voltage AC, direct current (DC), AC converted to DC, or DC converted to AC, both filtered or unfiltered DC, and pulsating DC, or any other power source that can power the lighting sources.

Figure 2A:
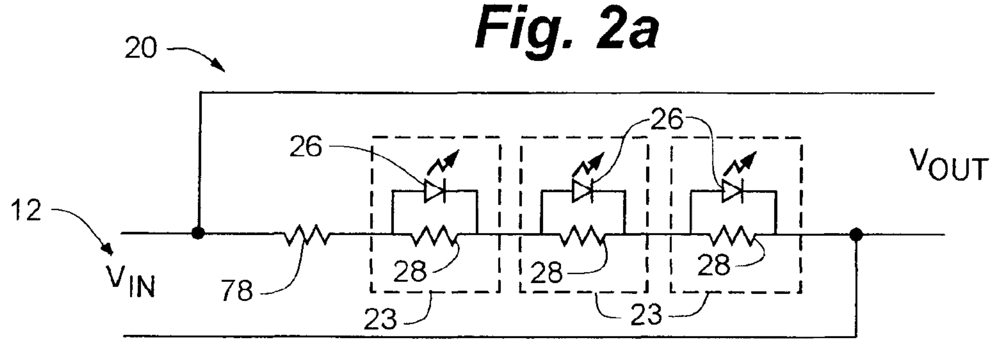
FIGS. 2*a*-2*c* show various configurations and locations of the current limiting resistor and series and series-parallel configurations of FIG. 2.
Figure 2B:
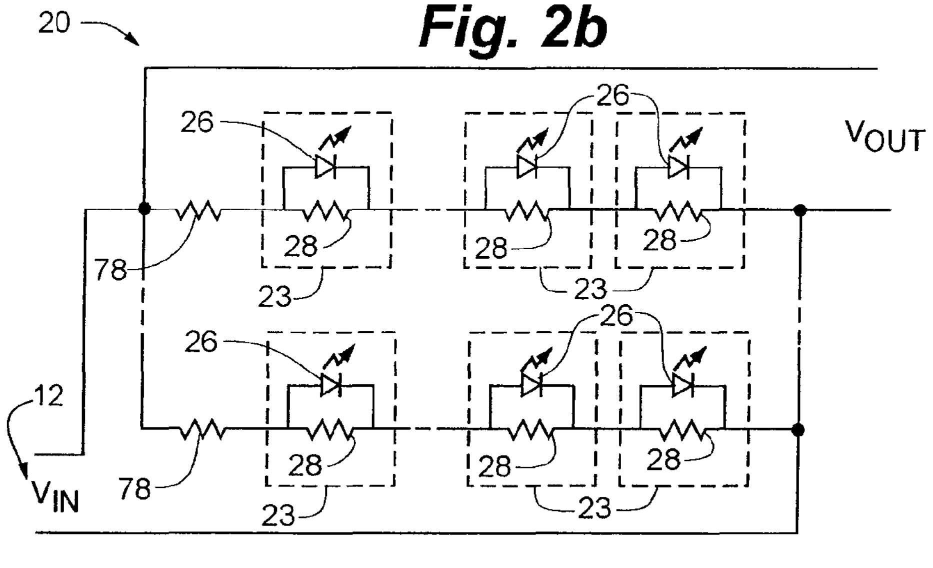
Figure 2C:
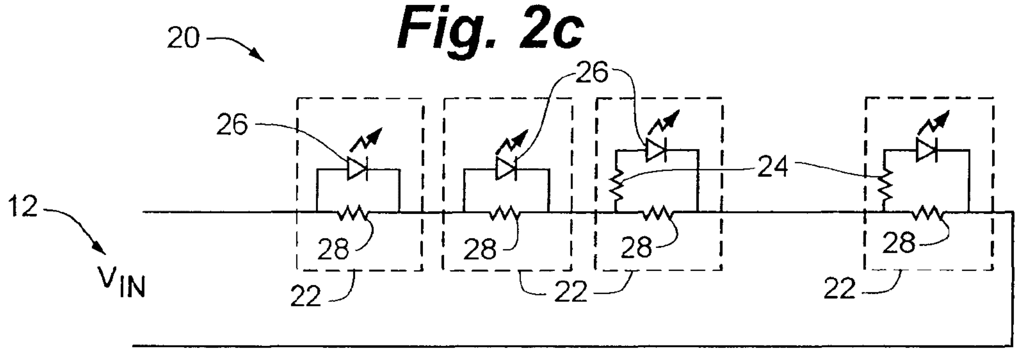

FIGS. 2*a*-2*c* show various configurations and locations of the current limiting resistor and series and series-parallel configurations of FIG. 2. FIGS. 2*a* and 2*b*, show light source assemblies, 22, that contain only the light source, 26, and the bypass resistor, 28, with the current limiting resistor located outside of the light source assembly 22.

Figure 2D:
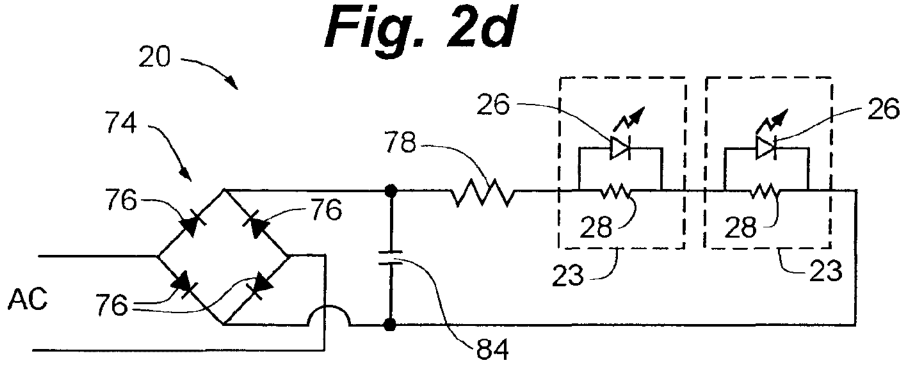
FIG. 2D shows a circuit diagram of one embodiment using a full wave rectifier with an optional filter capacitor.

FIG. 2D shows a circuit diagram utilizing a filtered full wave rectifier, 82 with an optional filter capacitor 84. The full wave rectifier could be replaced by a single rectifier diode, 76, to produce ½ wave rectification, and can be optionally filtered by capacitor 84. If a large enough capacitor 84 is selected, utilizing a single diode, 76, it could simulate full wave rectification to the circuit.

Figure 15:
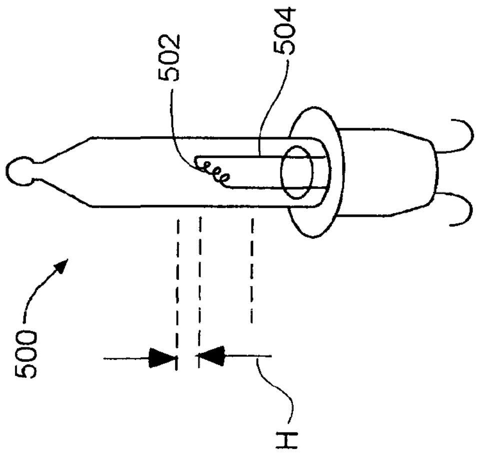
Fig. 15 PRIOR ART
FIG. 15 is an elevational view of a prior art bulb.

It was desired to utilize incandescent bulbs with the resistive bypass circuit 10 as shown in FIG. 1. In order to make the resistor set 10 work with modern, high temperature materials, it was needed to reduce the wattage of the bulbs to at least 0.25 W (standard bulbs in the industry are either the common 0.425 W bulb, or the less common 0.35 W bulb, as noted in prior art FIG. 15), but it is preferable to use 0.20 Watts. Sets using 0.25 W bulbs are on the edge of passing ANSI/UL standards, a critical condition for placing such sets in the marketplace. The 0.20 W bulbs, on the other hand, more safely allow the set to operate, however, either could be used.

While the 0.25 W bulbs (2.5V, 100 mA) were close in brightness to the 0.425 W bulbs (2.5V, 170 mA) that are commonly used, by using a thinner filament wire or other techniques to compensate for lumen output, the brightness of the 0.25 watt bulb is substantially equal to the standard 0.425 bulb. A conventionally constructed 0.20 W bulb (2.5V, 80 mA) bulb is even dimmer than the 0.35 W bulb (2.5V, 140 mA), and in the holiday market, the market demands bright bulbs.

Figure 16:
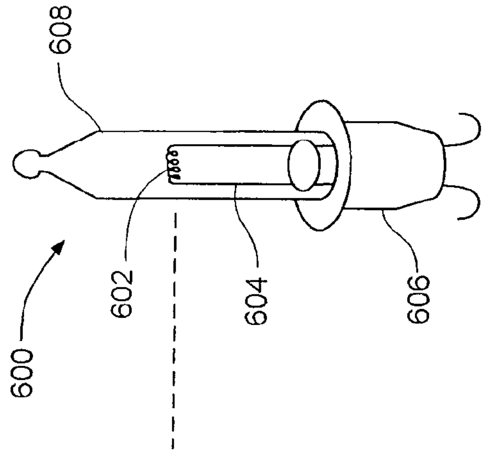
FIG. 16 is an elevational view of a bulb of the present invention.
Figure 17:
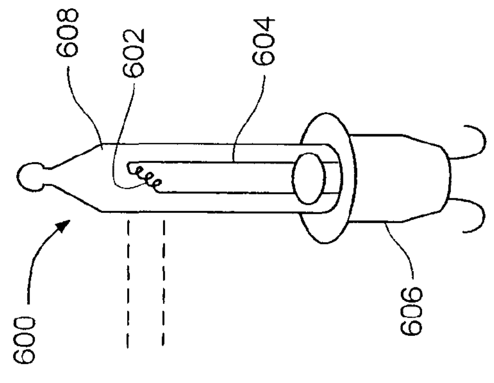
FIG. 17 is an elevational view of a bulb of a further embodiment of the present invention.

To make up for the shortcomings of a conventionally constructed 0.20 W bulb, the bulbs of the present invention, noted generally at 600 in FIGS. 16 and 17, employ a higher purity tungsten filament, along with a tighter coil of the filament 602. Further, the filament 602 is disposed higher into the bulb canopy 608 by the dimension H, noted in FIG. 15. The filament 602 is connected by relatively longer leads 604 than the leads 504 of the prior art that support the prior art filament 502. An advantage of such disposition is that losses from the plastic bulb adaptor 606 at the bottom of the bulb 600 did not absorb as much light. Such disposition of the filament 602 provides for a measurably brighter bulb 600, and also, as viewed by the human eye, an even brighter bulb 600 is perceived as compared with the prior art construction of FIG. 15, as the filament 602 is higher up into the bulb canopy 608, a construction that hasn't been done in the industry.

Further, to enhance the brilliance of the reduced wattage, one version of the low energy bulb 600 of the present invention, the filament 602 is formed of a purer form of tungsten and is of thinner construction as compared to the prior art bulb 500. Additionally, the filament 602 is wound tighter than the filament 502 of the prior art. However, one skilled in the art would recognize that if brighter bulbs were not desired, standard bulb construction could be utilized.

In addition, as noted with respect to FIG. 2 above, resistor sets 10 may be employed with light sources 26 being LEDs. Such LEDs typically operate at much lower current (20 mA) with a power draw of 0.08 W or less, and therefore allow for very cool operation of the resistor bypass circuit 28, even when the bypass resistor 28 is continually conducting. In either case, there is substantial energy savings. In another embodiment, higher power LEDs or several LEDs in parallel may be employed across the bypass resistor.

The above noted features allow the resistor bypass circuit 10 to operate as a twinkling set by inserting a flasher bulb into any part of the circuit or, if provided, into a socket. Flasher bulbs are bulbs where a bimetallic strip heats, and open circuits the bulb (see for example, Fisherman), where a normal holiday light set that creates a twinkling effect has to use twinkling bulbs, where when the bimetallic strip is heated by the filament, it shorts out the bulb, allowing the remaining bulbs to light. In such sets where the bulbs short, ANSI/UL has very stringent requirements for construction and operation. In contrast however, in the resistor bypass set 10 of the present invention, use of a flasher bulb is not restricted, nor does it pose any additional safety concerns, as when the flasher bulb open circuits, it allows the resistor bypass set to work as it would normally, and actually reduces the current to the remaining bulbs, allowing the remaining bulbs to run cooler, as compared to the twinkle bulb set where it operates hotter when one or more bulbs is in the shorted condition.

The resistor bypass set 10 also has the advantage of being a safer set than the standard mini light sets that commonly use a shunt wire inside the bulb to allow the current to continue flowing, as sets containing shunted bulbs create short circuits across the bulb, further dividing the input voltage by the remaining bulbs, increasing the power drop across each bulb. The increased power drop increases the surface temperature of the bulb, and causing the remaining bulbs in the set to burn out faster. This repeated action causes the bulbs to become very hot, where as the resistor bypass set 10 of the present invention operates such that every bulb failure, places a higher resistance into the set than the bulb it replaces, causing the remaining bulbs to proportionally dim, causing them to increase their life, and to run cooler. However, the resistor could be sized such that the current is not reduced, and may remain relatively constant, or even slightly increase, depending on the effect desired.

Figure 3:
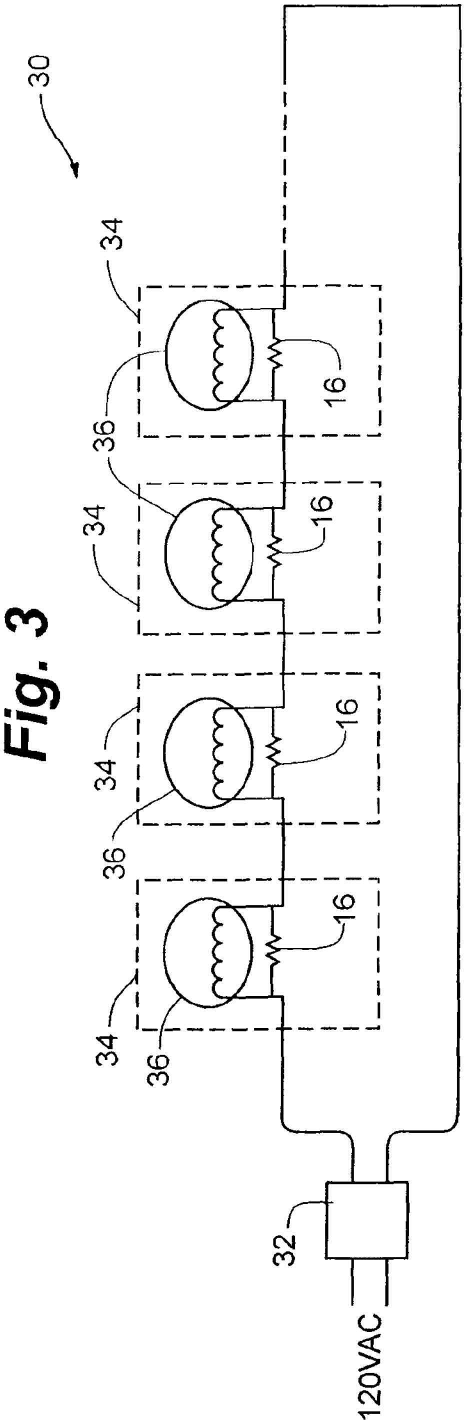
FIG. 3 is a diagram of a light string embodiment of the present invention where the lighting sources are incandescent bulbs and the lighting element is a filament.

FIG. 3 is an embodiment of the present invention in the form of a series-connected decorative light string 30. Decorative light string 30 includes power plug 32, optional light source assemblies 34, incandescent bulbs 36 and bypass resistors 16. Power plug 32 may directly plug into utility power (120V, 208V, 220V, 240V, 280V, etc), connect to a step down power supply (such as a Class 2 power supply) or may be omitted for direct connection to a power source. As shown in FIG. 3, incandescent bulbs 36 may be a miniature bulb-type (mini bulb) operating on 2.5 VAC at 70-120 mA, or some other low current draw bulb. Resistors 16 may be in the range of 30 ohms to 60 ohms, though the value of resistors 16 will vary according to the total current flow desired, as well as according to other factors mentioned above. Resistors 16 are configured in parallel with light sources 36. Light source assemblies 34, if provided, are configured electrically in series with each other. As indicated earlier, when a light source assembly 36 fails, total system current will flow through the corresponding bypass resistor 16, allowing the other light sources 36 to remain lit.

In one embodiment of the decorative light string 30 includes one or more light source assemblies 34 that includes a flashing device, but does not include a bypass element 16 in parallel, causing all of the remaining light source assemblies 34 in the series circuit of decorative light string 30 to flash.

Figure 4A:
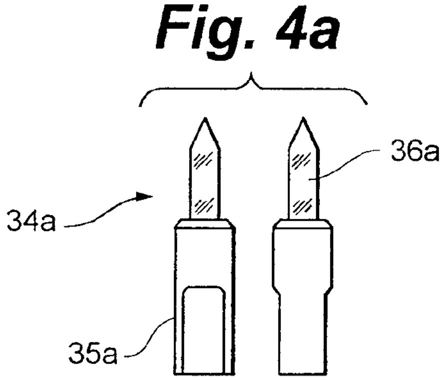
FIG. 4*a* is a front and side view of a light source assembly where the light source is an incandescent bulb.
Figure 4B:
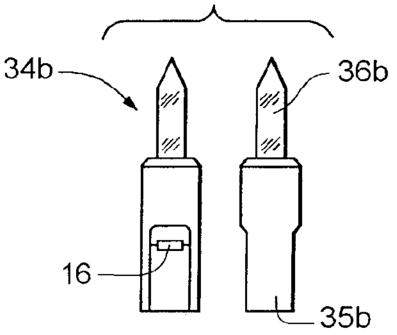
FIG. 4*b* is a front and side view of a light source assembly that includes an incandescent light bulb and a resistor.
Figure 4C:
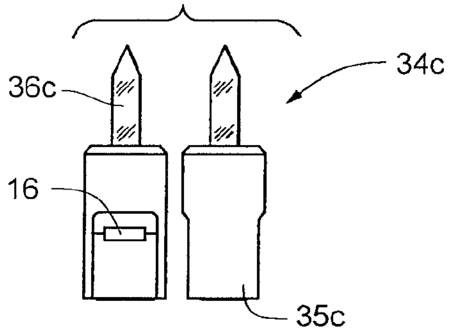
FIG. 4*c* is a front and side view of a light source assembly that includes an incandescent light bulb, a resistor, and a large-diameter lamp holder.
Figure 4D:
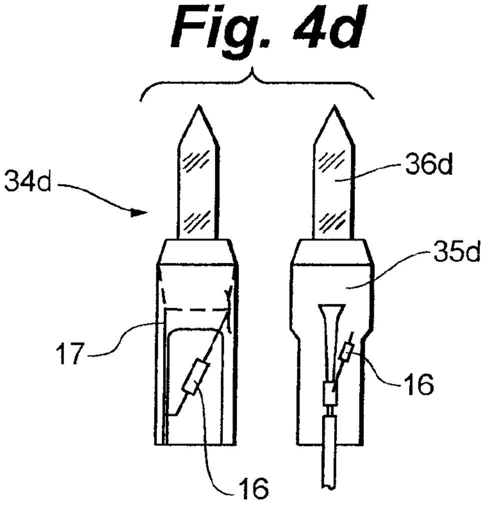
FIG. 4*d* is a front and side view of a light source assembly showing the brass contacts of the light source assembly and an alternate resistor mounting position.

Some methods of making light source assemblies 34 are further described in FIGS. **4*a-d*, but the present invention is not limited to the embodiments depicted in the figures. FIG. 4*a* illustrates a light source assembly 34*a* including a light source 36*a* in the form of a mini bulb, and a lamp holder 35*a*. FIG. 4*b* illustrates a light source assembly 34*b* that includes a light source assembly 34*b*, a light source 36*b* in the form of a mini bulb, a bypass resistor 16, and a lamp holder 35*b*. Lamp holder 35*b* may be larger than lamp holder 35*a* to accommodate bypass resistor 16. Bypass resistor 16 is connected across light source 36*b* in parallel. The connection may be accomplished by soldering, crimping, friction fit, compression fit, or other means, including connecting to a pair of brass contacts (not shown), to the leads of light source 26*b***, or to other conductors.

FIG. **4*c* illustrates yet another light source assembly, light source assembly 34*c*, which includes a light source assembly 34*c*, a light source 36*c* in the form of a mini bulb, a bypass resistor 16, and a lamp holder 35*c*. In this embodiment, lamp holder 34*c* is even larger than lamp holder 35*b***.

FIG. **4*d* illustrates another light source assembly, light source assembly 34*d*, which includes a light source assembly 34*d*, a light source 36*d* in the form of a mini bulb, a bypass resistor 16, and a lamp holder 35*d*. In this embodiment, lamp holder 34*d* may be longer than lamp holder 35*b*. In the embodiment shown in FIG. 4, one lead of bypass resistor 16 can be crimped to the brass contact. The other lead of bypass resistor 16 may be crimped to a second brass contact 17, or connected by other means, such that it is electrically in parallel with light source 36*d*. Other means includes being connected to the leads of light source 36**. In addition to crimping, soldering, friction fit, compression, and other common connection means may be employed.

In yet another embodiment, light sources 36 may be mini bulbs filled with an inert gas. Since the use of a bypass resistor 16 has the potential to decrease current flow through light sources 36, an inert gas, such as Krypton, can be used in place of a vacuum to allow for the bulb filament to burn whiter and maintaining the same bulb life expected from mini bulbs and get even closer to a standard mini bulb brightness.

Lamp holders 35 of light source assemblies 34 may include molded lamp holders, assembled-on lamp holders, heat-shrink formed lamp holders, and other types of lamp holders. Light sources 36 may be removable, or non-replaceable. In another embodiments, the light source assemblies 34 may by mounted on a rigid or flexible printed circuit board, or connected directly to conductors or wires.

Figure 5:
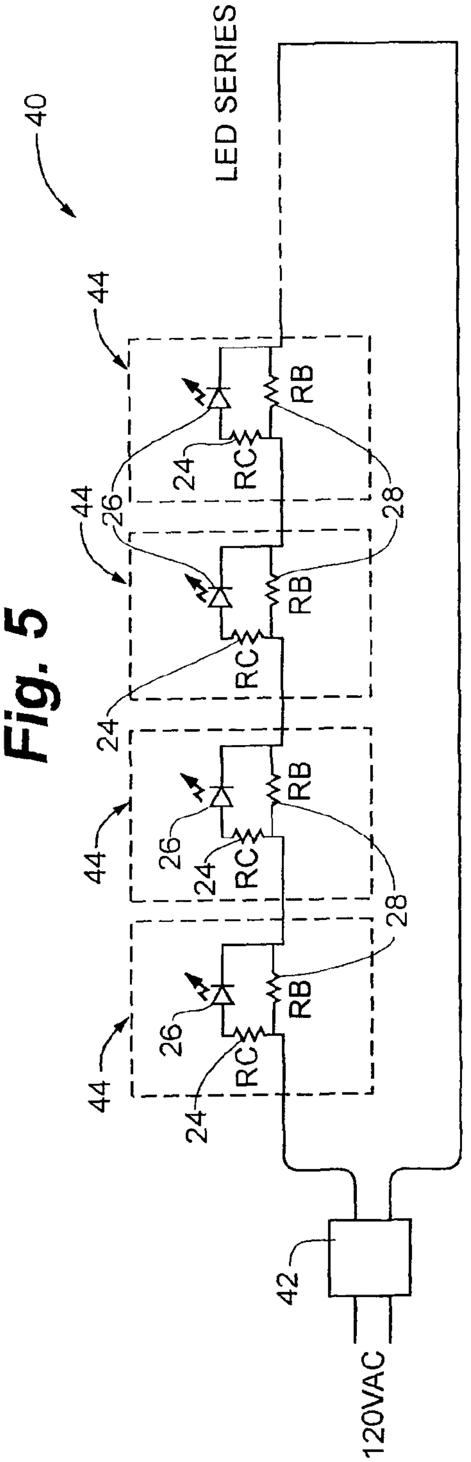
FIG. 5 is a diagram of a light string embodiment of the present invention where the light sources LEDs and the lighting element is an LED semiconductor chip.

Another embodiment of the present invention is a light string 40 as shown in FIG. 5. Light string 40 includes an optional power plug 42, light sources 26, current-limiting resistors 24, and bypass resistors 28. Light sources 26, current limiting resistors 24, and bypass resistors 28 may be packaged together into light source assemblies 44. The embodiment as shown works substantially as described above.

Figure 6:
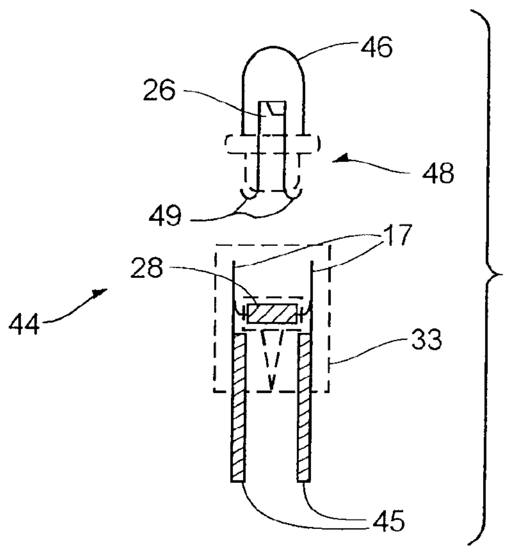
FIG. 6 is a front view of a light source assembly where the light source includes an LED encased in an epoxy lens.

One embodiment of light source 44 is shown in FIG. 6. Lamp holder base 33 houses bypass resistor 28, brass contacts 17, and the ends of wires 45. Bypass resistor 28 is connected to brass contacts 17 or other contact material to create a parallel configuration. Brass contacts 17 may be crimped on to wires 45 or other conductors. The optional lamp holder adapter 48 attaches to epoxy or some other material lens 46. The lens 46 encases light source 26, where light source 26 in this embodiment is an LED.

In another embodiment, the bypass resistor 28, may be located directly across the LED leads 49 outside of any optional lens material, 46.

In an alternate embodiment, the bypass resistor 28 may be located within the LED lens material 46 in parallel with the LED, or even inside the glass bulb envelope for incandescent bulbs.

Figure 7:
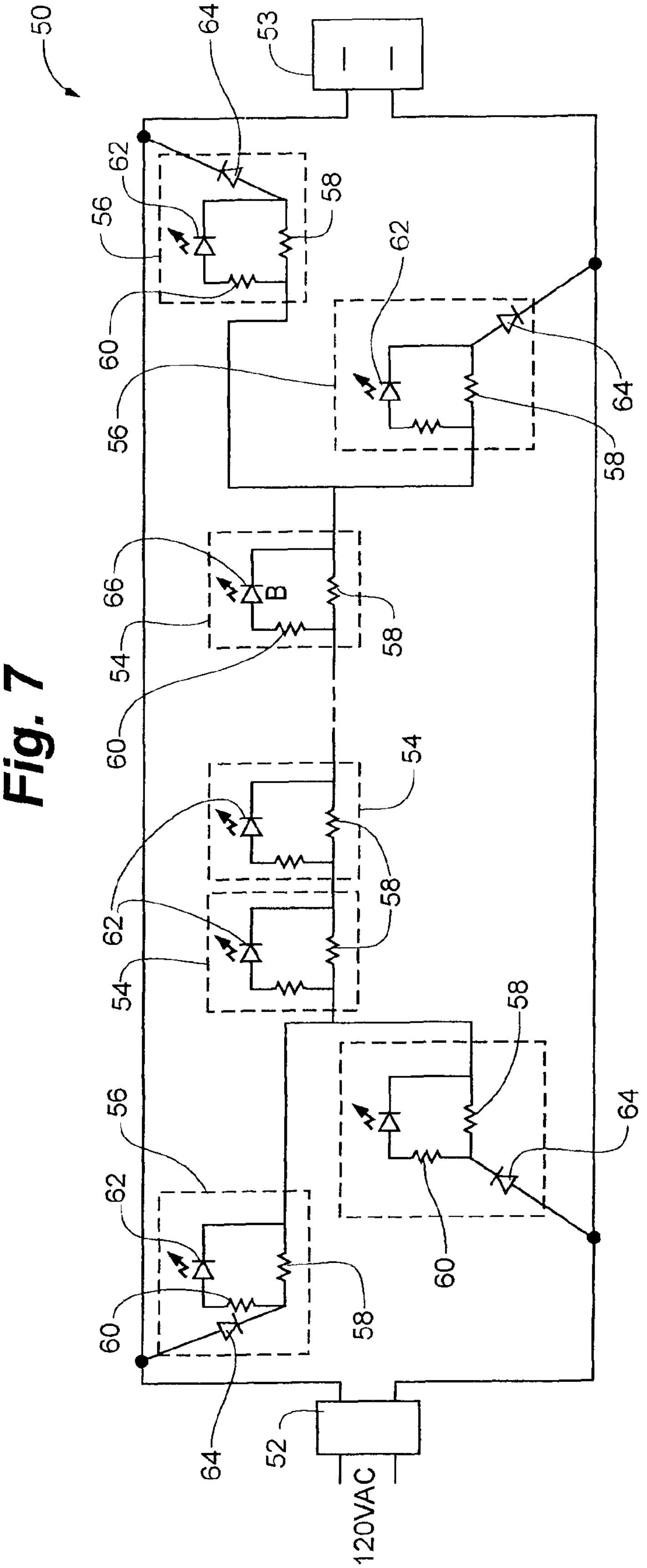
FIG. 7 is a diagram of one embodiment of the present invention that produces a twinkling effect and includes a split construction of a full wave rectifier.

FIG. 7 illustrates another embodiment of the present invention, light string 50, that utilizes partial rectification and blinking LEDs inside the epoxy lens. Light string 50 includes a power plug 52, end connect 53, and light source assemblies 54 and 56. Light source assemblies 54 are connected in a series configuration. Light source assemblies 56 are connected to the series-connected light sources 54 as shown in FIG. 7.

Light source assemblies 56 includes a bypass resistor 58, optional current limiting resistor 60, light source 62, which in this embodiment is an LED, and diode 64. Light source assembly 56 may also includes a lamp holder (not shown), similar to the ones described above.

Light source assemblies 54 includes a bypass resistor 58, optional current limiting resistor 60, and light source 62 or light source 66. In this embodiment, light source 62 is an LED chip, and light source 66 is a "blinking" LED that incorporates a chip that turns the LED on and off for a blinking or flashing effect. Operation of light source 66 is independent of the other light sources 62 due to the bypass resistor 58. Light source assembly 54 may also includes a lamp holder (not shown), similar to the ones described above. Circuit 50 may utilize more than one blinking LED 66, per circuit, or may only include blinking LED 66 as its light source.

In this embodiment, diodes 64 provide full-wave rectified power to light source assemblies 54, causing light sources 62 and 66 of light source assemblies 54 to remain lit throughout most of the AC power cycle. Light source assemblies 56 receive partial rectification due to the particular configuration of FIG. 7, causing light sources 62 of light source assemblies 56 to be powered throughout approximately half the AC power cycle.

When light source 66 is a blinking LED chip as shown in FIG. 7, current is periodically interrupted to the LED on the chip. Without bypass resistors 58, this would cause all light sources in light string 50 to lose power due to an interruption of current flowing through the series-connected circuit. However, bypass resistor 28 allows current to continue flowing, maintaining power to other light sources 62 and 66. Under normal operation, light source 66 will cause its LED to blink on and off, creating a twinkling effect, while other light sources 62 remain powered and lit. The use of multiple light sources 66 in a light string 50 creates a desirable twinkling effect as light sources 66 turn on and off, while light sources 62 remain lit.

In another embodiment, Light source 66 may be a multi LED chip configuration, programmed to change the light output color of the light source. Alternate embodiments may use a light source 66 where the bypass device 80 is an electronic circuit, or integrated circuit across the LED leads inside or outside of the epoxy housing/lens.

Figure 8:
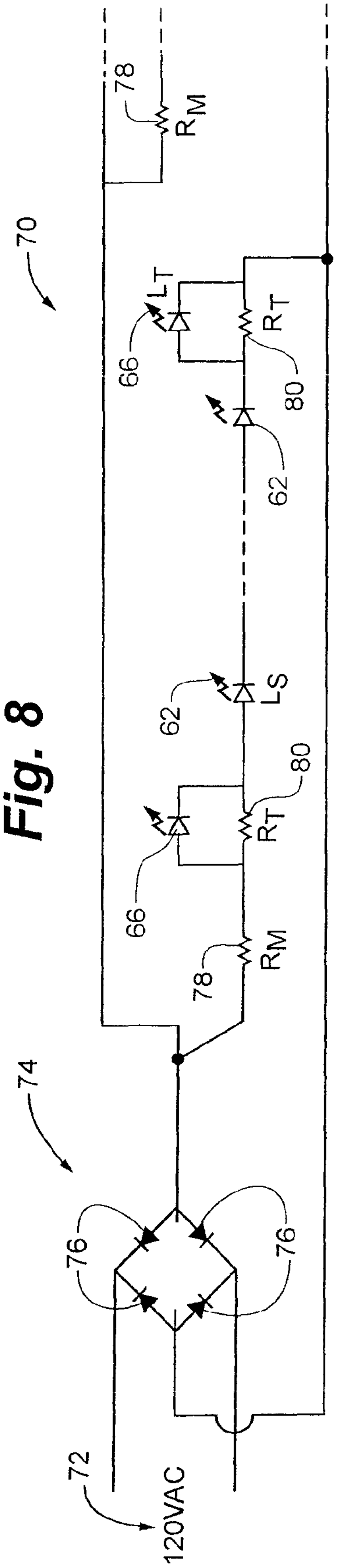
FIG. 8 is diagram of another embodiment of the present invention that produces a twinkling effect and includes traditional full-wave rectification.

FIG. 8 illustrates another embodiment where, a resistive bypass circuit 70 utilizes full-wave rectification to provide power to all light sources 62 and 66. Resistive bypass circuit 70 includes an AC power source 72, full-wave rectifier 74 with optional filter capacitor (not shown), main current limiting resistor 78, bypass resistors 80, light sources 66 and 62. Full-wave rectifier 74 includes four diodes 76. Full wave rectifier 74 may optionally employ one diode 76, and a sufficiently sized filter capacitor to simulate full wave rectification. The AC power source 72 may be any source voltage.

In this embodiment, full-wave rectifier 74 provides DC power for bypass circuit 70. Main current limiting resistor 78 limits the total amount of current flowing through circuit 70 and is sized partially based on the number of light sources 62 and 66. The use of a single current limiting resistor 78 rather than multiple current limiting resistors simplifies design and manufacturing efforts, but may optionally be manufactured with multiple current limiting resistors as described in the embodiments above. Lights source 66 in the form of blinking LED chips, along with bypass resistors 80 create a twinkling effect when embodied in a light string. The size of bypass resistor 80 depends on the electrical characteristics of light source 66, but in one embodiment may be 300 to 600 ohms. In some embodiments, bypass resistor 80 may only be used in conjunction with light sources 66, and not with light sources 60. This configuration would enable the twinkling effect, but would eliminate the bypass function at light sources 62.

Another embodiment is the use of circuit 70 in a DC-supplied circuit, such that full wave rectifier 74 is not required. Additional embodiments of circuit 70 are configured in a series-parallel configuration. In another embodiment, light source 66 may be a multi LED chip configuration, programmed to change the light output color of the light source.

Figure 9:
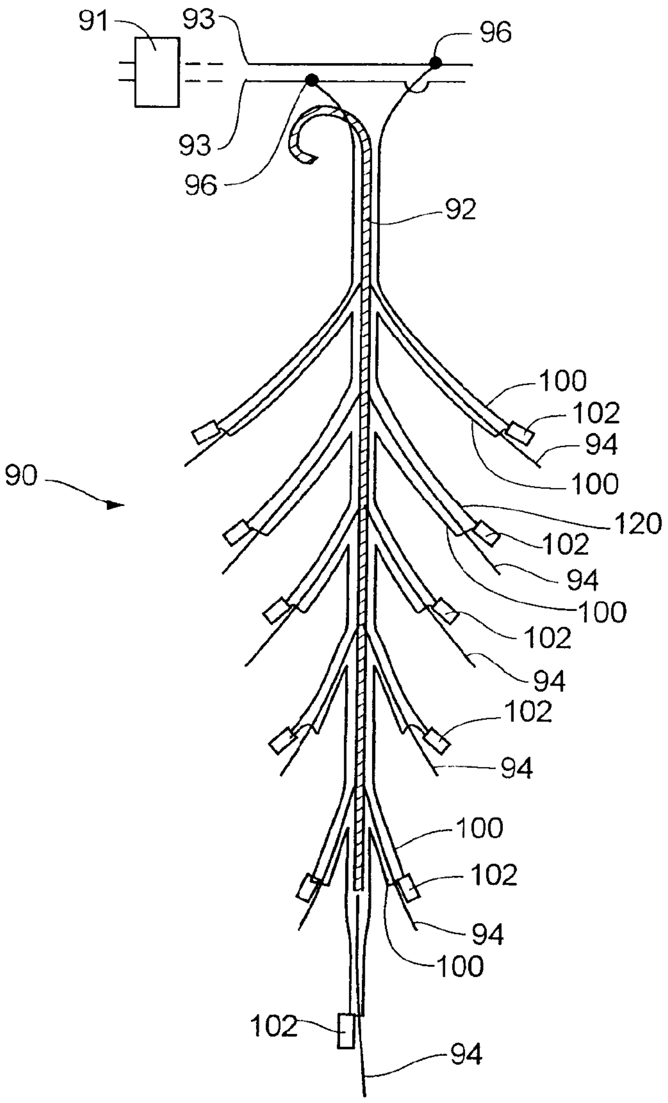
FIG. 9 is a front and close-up view of the present invention embodied in a wire tree branch.

FIG. 9 depicts a decorative lighting sculpture 90 that includes an optional power plug 91, wires 98, optional connectors 96, main rod 92, branches 94, wires 100 and light source assemblies 102. Power plug 91 may be connected in one embodiment to a 45 VDC to 50 VDC class 2 transformer with an output of 1.2 A, though other voltage ranges and power sources may be used. Alternatively, light sculpture 90 may not include power plug 91 and may be directly connected a power source. Light source assemblies 102 may be similar in configuration to the other light source assemblies described above, utilizing incandescent bulbs, LEDs, or other light sources configured in parallel with a bypass resistor.

In alternate embodiments, the bypass resistor may be replaced by bypass circuits utilizing transistors or other electronic active circuits.

Figure 10:
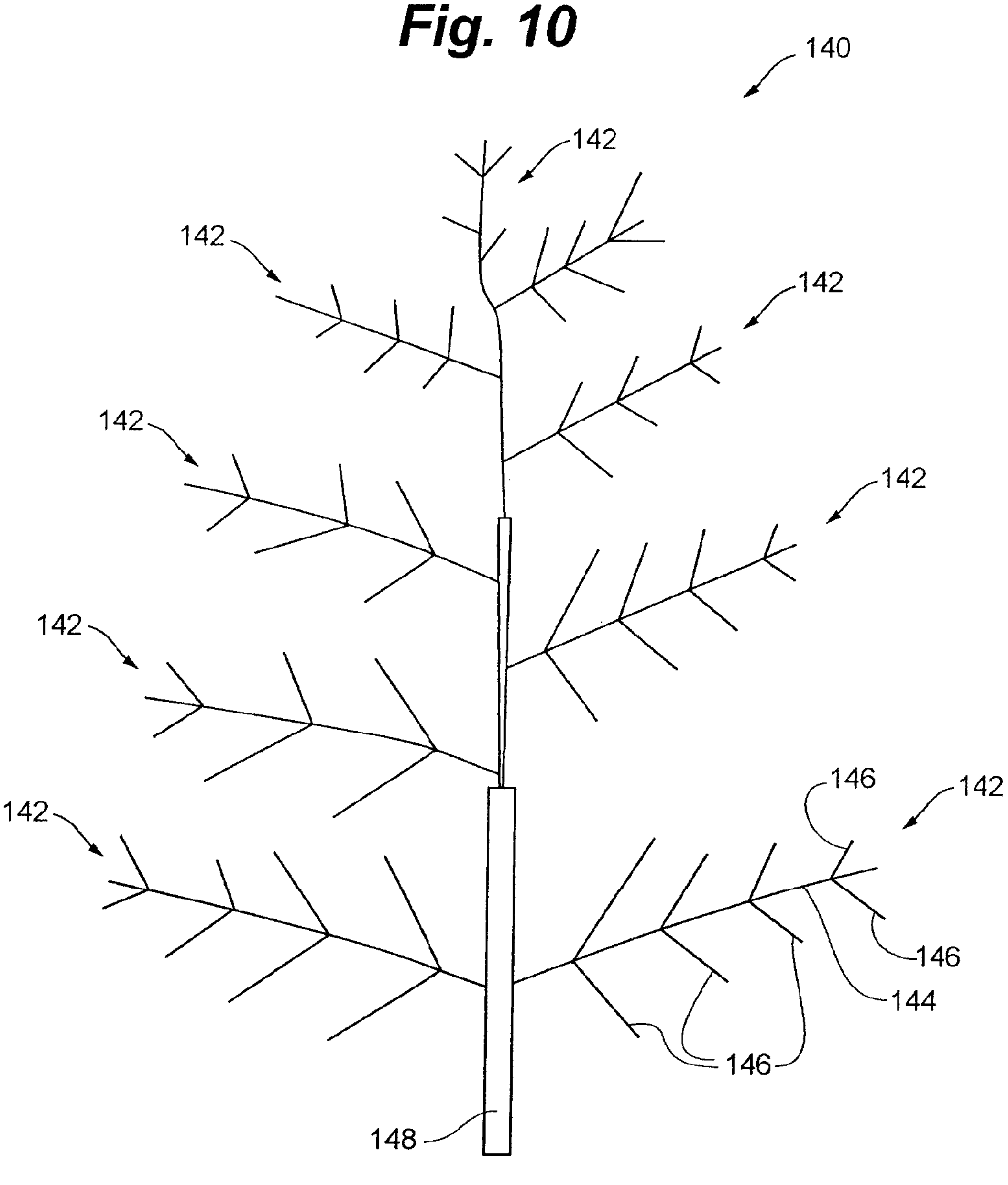
FIG. 10 is a front view of a needless artificial tree as used in a lighted green goods system of the present invention.
Figure 11:
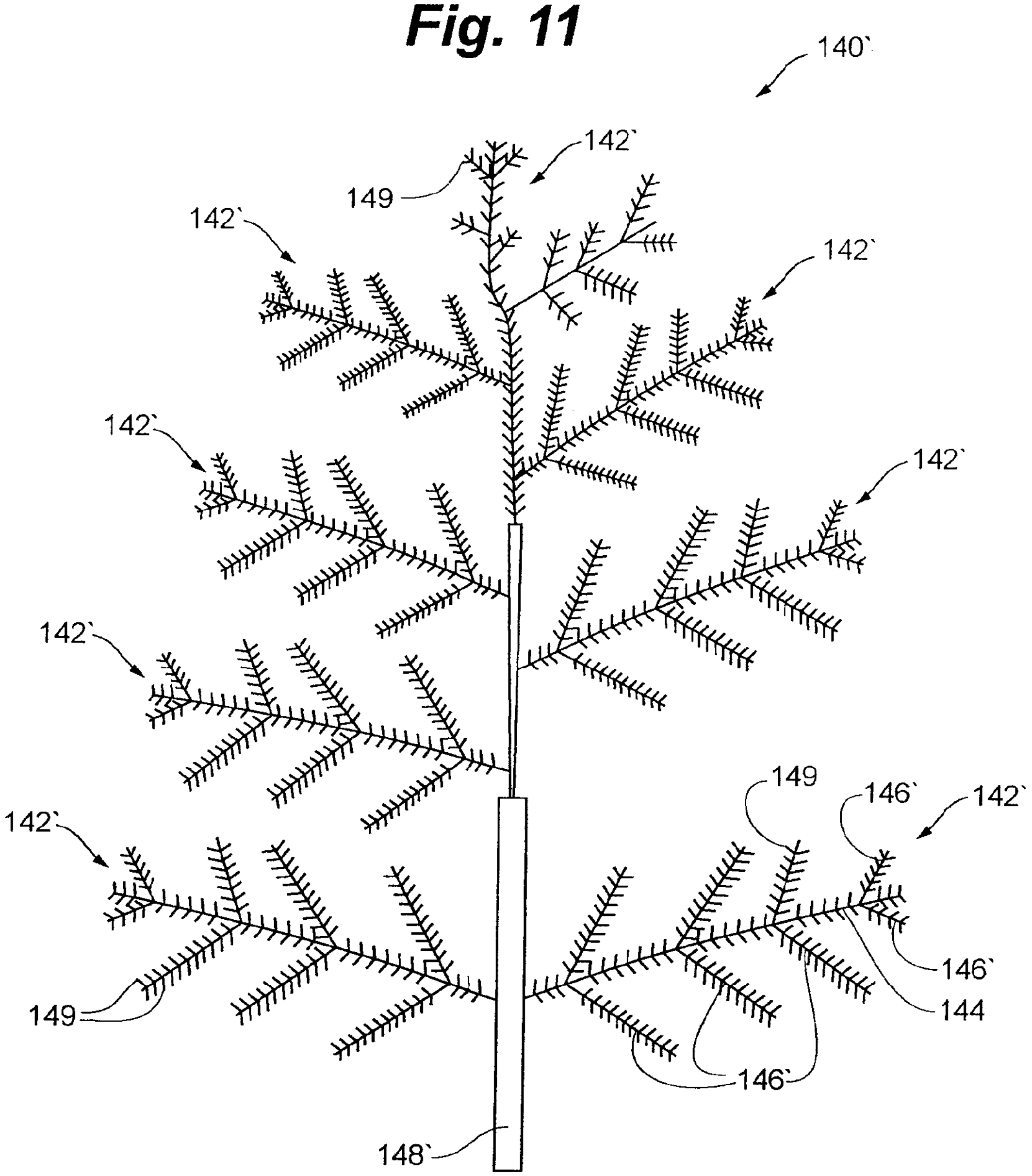
FIG. 11 is a front view of an artificial tree with needles as used in a lighted green goods system of the present invention.
Figure 12:
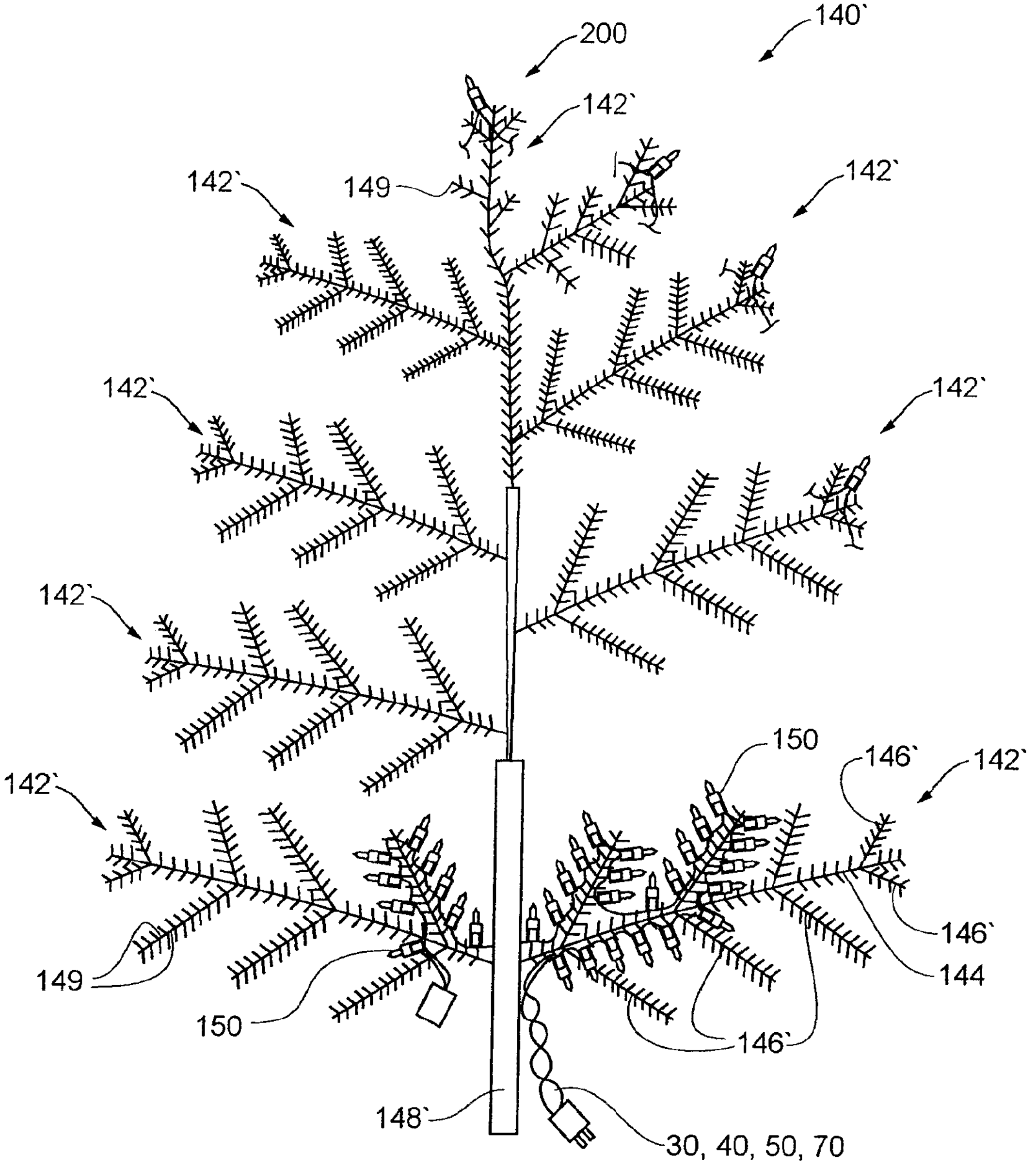
FIG. 12 is a front view of one embodiment of a lighted green goods system using bypass circuit light strings.

The circuits and light strings of the present invention as applied to artificial trees, wreaths, garlands, and other artificial greenery, or alternatively to medium to large decorative products, such as stars, figures, icons and other decorative products provide a number of advantages. Replacing light strings due to light sources that have failed on a light string that is attached to an artificial tree or other decorative product, can be a difficult task since the string is not easily removed from the tree or products and the use of electric testers is not practical due to the fields such products produce with the volumes of wires and optional metal support structures. The bypass circuits and light sets described herein ensure that the light string will continue to remain lit even in the event of a light source failure, meaning that the entire light string does not have to be removed from the tree or decorative product. The combination of circuits, light strings and tree make a reliable, convenient lighted green goods system. FIGS. 10-12 depict some of the artificial trees used in such a lighted green goods system.

FIG. 10 shows one version of an artificial tree 140 that includes a tree trunk 148, branches 142, branch mains 144, and sub-branches 146. Artificial tree 140 may be constructed of a combination of many materials as described above. In this embodiment, artificial tree 140 is constructed primarily of painted metal, or in another embodiment made primarily of plastic, or a combination of plastic and metal.

FIG. 11 shows another version of an artificial tree, 140'. Artificial tree 140' includes tree trunk 148', branches 142', branch mains 144', sub-branches 146' and needles 149. Needles 149 are commonly derived from PVC, nylon, and/or PE and may be green in color to make artificial tree 140' appear to be an evergreen or pine tree. In another embodiment it may use white needles and branches for different aesthetics.

FIG. 12 light string, such as light string 30, 40, 50, 70, or a combination thereof, attached to branches 142 of tree 140 to form a pre-lit tree system 200. Light strings 30, 40, 50, 70, or other embodiments of the present invention, may be similarly attached to trees 140'. Light string 30, 40, 50, 70 is shown attached to tree 140 via clips 150. Clip 150 may include but are not limited to C clips, snap lock clips, and wire ties.

Figure 13:
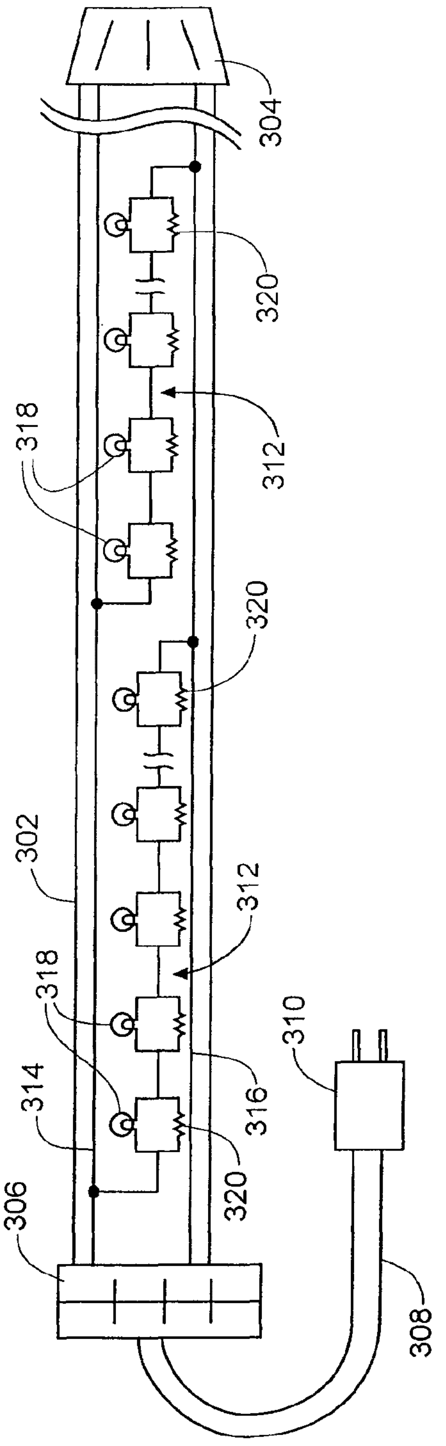
FIG. 13 is a view of a flexible lighting system with a bypass circuit using incandescent light sources.
Figure 14:
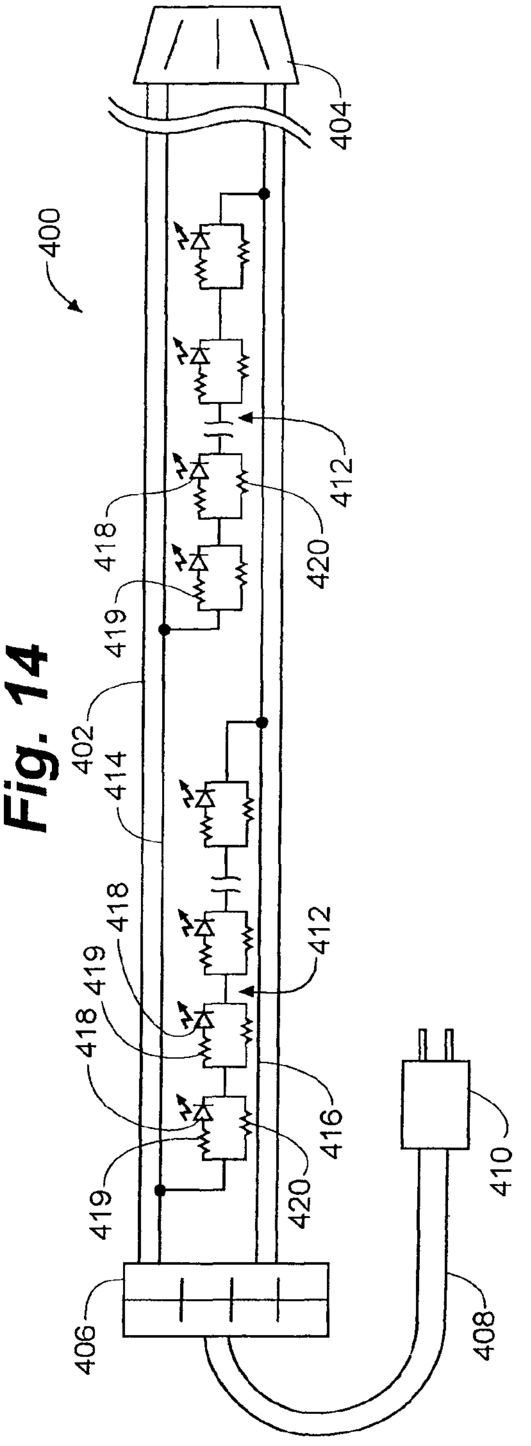
FIG. 14 is a view of a flexible lighting system with a bypass circuit using LED light sources.

FIGS. 13 and 14 depict the present invention in the form of flexible lighting, or rope lighting. Flexible lighting 300 as depicted in FIG. 13 includes an outer encasement 302, end cap 304, power cap 306, power cord 308, power plug 310, and one or more bypass circuits 312. Flexible lighting 300 may operate on 120VAC, which is transmitted through power plug 310 and power cord 308, though other voltages may be used, and the input may be rectified or DC. Outer encasement 302 is typically made of a PVC material, and houses bypass circuit 312. Power cap 306 assists in attaching power cord 308 to bypass circuit 312 and may attach to outer encasement 302 by any number of known methods.

Bypass circuits 312 are series circuits and each bypass circuit 312 is connected in parallel with the other. Bypass circuit 312 includes a plurality of light sources 314 electrically connected in parallel with bypass resistors 320. Light sources 318 may be incandescent bulbs, LEDs, or other light sources. As described in previous embodiments, bypass resistor 320 may be replaced with another active circuit device. Bypass circuit 312 may also include conductors 314 and 316 which extend the length of flexible lighting 300 and provide power to the bypass circuits 312 when more than one circuit 312 is employed.

Operation of flexible lighting 300 is similar to those embodiments described above. During normal operation, current flows through both light source 318 and bypass resistors 320. If light source 318 fails, the entire bypass circuit 312 current flows through bypass resistor 320, allowing flexible lighting 300 to stay lit.

FIG. 14 depicts a similar flexible lighting system that relies on LEDs, rather than incandescent bulbs. Flexible lighting 400 as depicted in FIG. 14 includes an outer encasement 402, end cap 404, power cap 406, power cord 408, power plug 410, and one or more bypass circuits 412. Flexible lighting 400 may operate on 120VAC, which is transmitted through power plug 410 and power cord 408, though other voltages may be used, and the input may be rectified or DC. Outer encasement 402 is typically made of a PVC material, and houses bypass circuit 412. Power cap 406 assists in attaching power cord 408 to bypass circuit 412 and may attach to outer encasement 402 by any number of known methods.

Bypass circuits 412 are series circuits and each bypass circuit 412 is connected in parallel with the other. Bypass circuit 412 includes a plurality of LEDs 414 electrically connected series with resistors 419. Series connected LEDs 414 and resistors 419 are electrically in parallel with bypass resistors 420. Light sources 418 may be LEDs, or other light sources. As described in previous embodiments, bypass resistor 420 may be replaced with another active circuit device. Bypass circuit 412 may also include conductors 414 and 416 which extend the length of flexible lighting 400 and provide power to the bypass circuits 412 when more than one circuit 412 is employed. The number or location of resistors 419 in each circuit 421 may vary based on circuit requirements, with some bypass circuits 412 not including a resistor 419. In other embodiments, resistor 419 may be located external to circuit 421, and in line with circuit Bypass circuit 412.

Operation of flexible lighting 400 is similar to those embodiments described above. During normal operation, current flows through both light source 418 and bypass resistors 420. If light source 418 fails, the entire bypass circuit 412 current flows through bypass resistor 420, allowing flexible lighting 400 to remain lit.

Other embodiments of flexible lighting 300 and 400 may incorporate twinkling, flashing and color changing properties as previously described above.

It is desired to utilize incandescent bulbs with the embodiment of FIG. 1. In order to make the resistive bypass set 10 function with modern, high temperature materials, it was needed to reduce the wattage of the bulbs to at least 0.25 W (standard bulbs in the industry are the 0.30 W bulb). It is preferable to use bulbs of 0.20 Watts. Sets using 0.25 W bulbs are on the edge of passing ANSI/UL standards, a critical condition for placing the resistive bypass set 10 in the marketplace. The 0.20 W bulbs, on the other hand, safely allows the set to operate and readily meet ANSI/UL standards, however, either 0.25 W or 0.20 W bulbs could be used.

In addition, the resistor sets with LED sources can also be employed, and as those typically operate at much lower current (20 mA) drawing approximately 0.08 W, those allow for very cool operation of the resistor bypass circuit. Additional embodiments may use a higher power LED or multiple LEDs connected in parallel across the resistive element.

Both of these lighting changes (lower wattage/higher brightness bulbs, and LEDs) were not anticipated, or contemplated by Fisherman, therefore only restricting it to flasher bulbs, and the use in such a set where the bulbs are never fully off.

In addition, this allows our resistor bypass set to operate as a twinkling set by inserting a flasher bulb into any circuit. Flasher bulbs are bulbs where the bimetallic strip heats, and open circuits the bulb, where a normal holiday light set that creates a twinkling effect has to use twinkling bulbs, where when the bimetallic strip is heated by the filament, it shorts out the bulb, allowing the remaining bulbs to light, however, in such sets where the bulbs short, ANSI/UL does not allow for such constructions in flexible (rope) lighting. However, in the resistor bypass set, use of a flasher bulb is not restricted, nor does it pose any additional safety concerns, as when the flasher bulb open circuits, it allows the resistor bypass set to work as it would normally, and actually reduces the current to the remaining bulbs, allowing to run cooler, vs. the twinkle bulb set where it operates hotter when one or more bulbs is in the shorted condition.

The resistor bypass set also has the advantage providing a shunting circuit, as ANSI/UL standards do not allow for shunts that short circuit the bulb in rope (flexible) lighting, as the bulbs are not replaceable, and shorts caused by shunt wires in or out to the bulb would create an unsafe condition as more and more bulbs burn out. A shunt wire inside the bulb to allow the current to continue flowing, as those bulbs create short circuits, further dividing the input voltage by the remaining bulbs, increasing the power drop across each bulb, thereby increasing the surface temperature of the bulb, and causing the subsequent bulb to burn out faster, and this repeated action causing the bulbs to become very hot, where as the resistor bypass set operates such that every bulb failure, places a higher resistance into the set than the bulb it replaces, causing the remaining bulbs to proportionally dim, causing them to increase their life, and run cooler. However, the resistor could be sized such hat the current is not reduced, and may remain relatively constant.

In addition to decorative lighting, the bypass circuits of the present invention may also be used in general lighting applications including portable lighting, auto lighting, traffic lights and the like.

The invention addresses many of the deficiencies and drawbacks previously identified. The invention may be embodied in other specific forms without departing from the essential attributes thereof; therefore, the illustrated embodiments should be considered in all respects as illustrative and not restrictive. The claims provided herein are to ensure adequacy of the present application for establishing foreign priority and for no other purpose.

What is claimed is:

1. A resistor bypass circuit for a series lighting circuit comprising a plurality of serially connected light sources and a bypass resistor being connected in parallel with at least one of the respective light sources, each respective light source being capable operating on a one hundred percent duty cycle as desired;

said light sources including at least one light source comprising a structure for increasing the perceived brightness of the light source and reducing heat transmission from the light source further comprising: electrical leads connected to the light source, an elongated airtight envelope having a base, a tubular section, a tapered section and a transparent domed canopy top terminating in an apex having a generally bulbous peak, thereby creating a transparent light pipe end of generally solid transparent material, secured to said base, said envelope having a top distal end and a bottom end, so that light radiating from the light source will pass though the peak; said leads to the light source being of sufficient length to locate said light source inside said envelope being proximate said canopy top thereof so that heat generated is more distant from the base and more light is transmitted through said light pipe.

2. The resistor bypass circuit of claim 1, where the circuit is series-parallel connected.

3. The resistor bypass circuit of claim 1, the light source being an incandescent bulb.

4. The resistor bypass circuit of claim 1, the light source being a semiconductor.

5. The resistor bypass circuit of claim 4, the light source the semiconductor light source providing a twinkling effect.

6. The resistor bypass circuit of claim 5, the semiconductor light source utilizing electronic circuits that control the flashing rate of the light source, which would only affect the individual lighting element as the resistive bypass would allow current to continue to flow in remaining lighting elements in the series circuit.

7. The resistor bypass circuit of claim 5, the electronic circuits being LED packages that incorporate integrated circuits (ICs).

8. The resistor bypass circuit of claim 1, the light source being an LED.

9. The resistor bypass circuit of claim 8, the light source being a semiconductor light source for providing color changing characteristics.

10. The resistor bypass circuit of claim 9, the semiconductor light source utilizing LED packages that incorporate two or more LED chips, and an integrated circuit (IC), the integrated circuit controlling each LED chip in respective LED packages independently.

11. The resistor bypass circuit of claim 10, the IC controlling the current and/or voltage to the individual LED chips in the LED package, the control providing for the mixing of the LED chip colors to get various resultant colors.

12. The resistor bypass circuit of claim 11, the control only affecting individual lighting element, the bypass resistor providing for current continuing to flow in remaining lighting elements in the series circuit.

13. The resistor bypass circuit of claim 1, a respective resistive bypass resistor being connected in parallel with more than one light source, the failure of one of the light sources thereby only affecting a limited number of the plurality of light sources.

14. The resistor bypass circuit of claim 1 being utilized in AC or DC circuits powered form a power source selected from the list consisting of batteries, step down transformers, AC utility power, or converters from AC to DC or DC to AC power, pulsed DC, and filtered or unfiltered DC, or partially filtered AC.

* * * * *